US010936959B2

(12) United States Patent
Baveja et al.

(10) Patent No.: US 10,936,959 B2
(45) Date of Patent: *Mar. 2, 2021

(54) DETERMINING TRUSTWORTHINESS AND COMPATIBILITY OF A PERSON

(71) Applicant: Airbnb, Inc., San Francisco, CA (US)

(72) Inventors: Sarabjit Singh Baveja, San Francisco, CA (US); Anish Das Sarma, Menlo Park, CA (US); Nilesh Dalvi, Sunnyvale, CA (US)

(73) Assignee: Airbnb, Inc., San Francisco, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/182,839

(22) Filed: Nov. 7, 2018

(65) Prior Publication Data
US 2019/0073597 A1 Mar. 7, 2019

Related U.S. Application Data

(63) Continuation of application No. 14/980,343, filed on Dec. 28, 2015, now Pat. No. 10,169,708, which is a
(Continued)

(51) Int. Cl.
*G06F 17/00* (2019.01)
*G06F 7/00* (2006.01)
(Continued)

(52) U.S. Cl.
CPC .......... *G06N 5/04* (2013.01); *G06F 16/24578* (2019.01); *G06F 21/316* (2013.01); *G06N 5/048* (2013.01); *G06N 20/00* (2019.01)

(58) Field of Classification Search
CPC .......... G06N 5/04; G06N 20/00; G06N 5/048; G06F 16/24578; G06F 21/316
(Continued)

(56) References Cited

U.S. PATENT DOCUMENTS 6,272,467 B1  8/2001  Durand et al.
7,822,631 B1  10/2010 Vander Mey et al.
(Continued)

FOREIGN PATENT DOCUMENTS

EP  2157520 A1  2/2010
EP  2706487 A1  3/2014
(Continued)

OTHER PUBLICATIONS

"U.S. Appl. No. 14/488,177, Examiner Interview Summary dated Mar. 20, 2015", 3 pgs.
(Continued)

*Primary Examiner* — Pavan Mamillapalli
(74) *Attorney, Agent, or Firm* — Schwegman Lundberg & Woessner, P.A.

(57) ABSTRACT

Systems and methods are provided for, are provided for analyzing each of a plurality of documents related to a person to identify content attributes that occur in a dictionary for behavior or personality traits, calculating an initial score for each behavior and personality trait related to the identified content attributes, calculating trait metrics for each behavior or personality trait by combining initial scores for each behavior or personality trait, providing the trait metrics as input to a rule based scoring and machine learning system, obtaining, from the rule based scoring and machine learning system, a trustworthiness score of the person output from the rule based scoring and machine learning system, receiving an indication that a second person trusts the person, creating a relationship between the second person and the person, and adjusting the trustworthiness score of the person based on, at least, a trustworthiness score of the second person.

20 Claims, 8 Drawing Sheets

Related U.S. Application Data continuation of application No. 14/753,211, filed on Jun. 29, 2015, now abandoned, which is a continuation of application No. 14/488,177, filed on Sep. 16, 2014, now Pat. No. 9,070,088.

(51) Int. Cl.
    *G06N 5/04*      (2006.01)
    *G06N 20/00*     (2019.01)
    *G06F 16/2457*   (2019.01)
    *G06F 21/31*     (2013.01)

(58) Field of Classification Search
    USPC .......................................................... 707/600
    See application file for complete search history.

(56) References Cited

U.S. PATENT DOCUMENTS

| | | | |
|---|---|---|---|
| 7,930,302 | B2 | 4/2011 | Bandaru et al. |
| 7,991,635 | B2 | 8/2011 | Hartmann |
| 8,019,689 | B1 | 9/2011 | Nachenberg |
| 8,056,128 | B1 | 11/2011 | Dingle et al. |
| 8,150,803 | B2* | 4/2012 | Hoang ............... G06Q 10/06 707/616 |
| 8,150,842 | B2 | 4/2012 | Brougher et al. |
| 8,176,057 | B2 | 5/2012 | Kim et al. |
| 8,234,688 | B2 | 7/2012 | Grandison et al. |
| 8,239,953 | B1 | 8/2012 | Satish et al. |
| 8,312,276 | B2 | 11/2012 | Chiou et al. |
| 8,380,607 | B2 | 2/2013 | Bollen et al. |
| 8,402,548 | B1 | 3/2013 | Muriello et al. |
| 8,423,425 | B2 | 4/2013 | Psota et al. |
| 8,521,734 | B2 | 8/2013 | Walther et al. |
| 8,539,359 | B2 | 9/2013 | Rapaport et al. |
| 8,549,651 | B2 | 10/2013 | Callahan et al. |
| 8,566,252 | B2 | 10/2013 | Harding |
| 8,606,792 | B1 | 12/2013 | Jackson et al. |
| 8,620,942 | B1 | 12/2013 | Hoffman et al. |
| 8,641,519 | B2 | 2/2014 | Herrmann et al. |
| 8,650,133 | B2 | 2/2014 | Pulito et al. |
| 8,676,937 | B2 | 3/2014 | Rapaport et al. |
| 8,688,701 | B2 | 4/2014 | Ghosh et al. |
| 8,694,401 | B2 | 4/2014 | Stewart |
| 8,712,907 | B1 | 4/2014 | Stibel et al. |
| 8,739,296 | B2 | 5/2014 | Walsh et al. |
| 8,744,866 | B1 | 6/2014 | Saxe et al. |
| 8,762,405 | B2 | 6/2014 | Qian et al. |
| 8,768,863 | B2 | 7/2014 | Gubin et al. |
| 8,775,418 | B2 | 7/2014 | Poon |
| 8,781,984 | B2 | 7/2014 | Schreiner et al. |
| 8,782,042 | B1 | 7/2014 | Cooke et al. |
| 8,793,255 | B1 | 7/2014 | Bilinski et al. |
| 8,793,593 | B2 | 7/2014 | Rasmussen et al. |
| 8,798,596 | B2 | 8/2014 | Shuster et al. |
| 8,812,690 | B1 | 8/2014 | Ramesh et al. |
| 8,812,982 | B2 | 8/2014 | Ross et al. |
| 8,819,789 | B2 | 8/2014 | Orttung et al. |
| 8,819,816 | B2 | 8/2014 | Stein et al. |
| 9,070,088 | B1 | 6/2015 | Baveja et al. |
| 9,397,839 | B2* | 7/2016 | Thoniel ............... H04L 63/0823 |
| 10,169,708 | B2 | 1/2019 | Baveja et al. |
| 2002/0045154 | A1 | 4/2002 | Wood et al. |
| 2004/0215502 | A1 | 10/2004 | Takahashi et al. |
| 2006/0015561 | A1 | 1/2006 | Murphy et al. |
| 2007/0179827 | A1 | 8/2007 | Gupta et al. |
| 2008/0059364 | A1 | 3/2008 | Tidwell et al. |
| 2008/0109451 | A1* | 5/2008 | Harding ............... G06Q 10/06 707/999.01 |
| 2008/0109491 | A1 | 5/2008 | Gupta |
| 2008/0207331 | A1 | 8/2008 | Beale |
| 2009/0228294 | A1 | 9/2009 | Choi et al. |
| 2009/0319518 | A1 | 12/2009 | Koudas et al. |
| 2010/0010935 | A1 | 1/2010 | Shelton |
| 2010/0076987 | A1 | 3/2010 | Schreiner |
| 2010/0153185 | A1 | 6/2010 | Ghosh et al. |
| 2010/0169265 | A1 | 7/2010 | Ristock et al. |
| 2010/0250605 | A1 | 9/2010 | Pamu et al. |
| 2010/0262606 | A1 | 10/2010 | Bedolla et al. |
| 2010/0274815 | A1 | 10/2010 | Vanasco |
| 2011/0093472 | A1* | 4/2011 | Dumant ............... G06F 16/2465 707/748 |
| 2011/0153551 | A1 | 6/2011 | Gabriel et al. |
| 2011/0173274 | A1 | 7/2011 | Sood |
| 2011/0258200 | A1 | 10/2011 | Drummond |
| 2012/0030302 | A1 | 2/2012 | Lund et al. |
| 2012/0072384 | A1 | 3/2012 | Schreiner et al. |
| 2012/0137367 | A1 | 5/2012 | Dupont et al. |
| 2012/0159647 | A1 | 6/2012 | Sanin et al. |
| 2012/0209970 | A1 | 8/2012 | Scipioni et al. |
| 2012/0290427 | A1 | 11/2012 | Reed et al. |
| 2012/0290551 | A9 | 11/2012 | Ghosh |
| 2012/0317046 | A1 | 12/2012 | Myslinski |
| 2013/0085844 | A1 | 4/2013 | Neystadt et al. |
| 2013/0103599 | A1 | 4/2013 | Sgrazzutti et al. |
| 2013/0110732 | A1 | 5/2013 | Uppal |
| 2013/0132360 | A1 | 5/2013 | Kuznetsov et al. |
| 2013/0173457 | A1 | 7/2013 | Chrapko et al. |
| 2013/0185292 | A1 | 7/2013 | Li et al. |
| 2013/0215116 | A1 | 8/2013 | Siddique et al. |
| 2013/0297543 | A1 | 11/2013 | Treiser |
| 2013/0297589 | A1 | 11/2013 | Work et al. |
| 2014/0040371 | A1 | 2/2014 | Gurevich et al. |
| 2014/0079297 | A1 | 3/2014 | Tadayon et al. |
| 2014/0207945 | A1 | 7/2014 | Galloway et al. |
| 2014/0258305 | A1 | 9/2014 | Kapadia et al. |
| 2015/0324749 | A1* | 11/2015 | Work ............... G06Q 10/1053 705/319 |
| 2016/0021093 | A1* | 1/2016 | Vinckier ............... G07C 9/22 726/9 |
| 2016/0110648 | A1 | 4/2016 | Baveja et al. |
| 2016/0154895 | A1* | 6/2016 | Koutra ............... G06N 5/048 706/46 |
| 2016/0381727 | A1* | 12/2016 | Dwarakanath ........ H04W 8/005 455/41.2 |

FOREIGN PATENT DOCUMENTS

| | | |
|---|---|---|
| EP | 2713329 A1 | 4/2014 |
| EP | 2747013 A1 | 6/2014 |
| WO | WO-2007101278 A2 | 9/2007 |
| WO | WO-2008137857 A1 | 11/2008 |
| WO | WO-2009077193 A2 | 6/2009 |
| WO | WO-2011139687 A1 | 11/2011 |
| WO | WO-2012027706 A1 | 3/2012 |
| WO | WO-2012162873 A1 | 12/2012 |
| WO | WO-2013029031 A2 | 2/2013 |
| WO | WO-2013070512 A1 | 5/2013 |
| WO | WO-2013077774 A2 | 5/2013 |
| WO | WO-2013082527 A1 | 6/2013 |

OTHER PUBLICATIONS

"U.S. Appl. No. 14/488,177, Non Final Office Action dated Feb. 12, 2015", 25 pgs.

"U.S. Appl. No. 14/488,177, Notice of Allowance dated May 26, 2015", 12 pgs.

"U.S. Appl. No. 14/488,177, Response filed Mar. 26, 2015 to Non Final Office Action dated Feb. 12, 2015", 11 pgs.

"U.S. Appl. No. 14/753,211 Non Final Office Action dated Oct. 6, 2015", 7 pgs.

"U.S. Appl. No. 14/753,211, Preliminary Amendment filed Jul. 8, 2015", 3 pgs.

"U.S. Appl. No. 14/980,343 Response filed Jul. 9, 2018 to Final Office Action dated Jun. 13, 2018", 16 pgs.

"U.S. Appl. No. 14/980,343, Advisory Action dated Jun. 15, 2017", 3 pgs.

"U.S. Appl. No. 14/980,343, Examiner Interview Summary dated Dec. 30, 2016", 3 pgs.

"U.S. Appl. No. 14/980,343, Final Office Action dated May 4, 2017", 17 pgs.

(56) References Cited

OTHER PUBLICATIONS

"U.S. Appl. No. 14/980,343, Final Office Action dated Jun. 13, 2018", 20 pgs.
"U.S. Appl. No. 14/980,343, Non Final Office Action dated Oct. 5, 2016", 22 pgs.
"U.S. Appl. No. 14/980,343, Non Final Office Action dated Nov. 15, 2017", 15 pgs.
"U.S. Appl. No. 14/980,343, Notice of Allowance dated Sep. 19, 2018", 15 pgs.
"U.S. Appl. No. 14/980,343, Response filed Jan. 4, 2017 to Non Final Office Action dated Oct. 5, 2016", 13 pgs.
"U.S. Appl. No. 14/980,343, Response filed Feb. 9, 2018 to Non Final Office Action dated Nov. 15, 2017", 13 pgs.
"U.S. Appl. No. 14/980,343, Response filed May 23, 2017 to Final Office Action dated May 4, 2017", 13 pgs.
"International Application Serial No. PCT/US2015/38255, International Preliminary Report on Patentability dated Mar. 30, 2017", 9 pgs.
"International Application Serial No. PCT/US2015/38255, International Search Report dated Sep. 30, 2015", 2 pgs.
"International Application Serial No. PCT/US2015/38255, Written Opinion dated Sep. 30, 2015", 7 pgs.
Adali, et al., "Measuring Behavioral Trust in Social Networks", Proc. Int'l Conference on Intelligence and Security Informatics (ISI), (May 2010), 3 pgs.
Adali, et al., "Predicting Personality with Social Behavior", 2012 IEEE/ACM International Conference on Advances in Social Networks Analysis and Mining, (Aug. 2012), 8 pgs.

\* cited by examiner

DETERMINING TRUSTWORTHINESS AND COMPATIBILITY OF A PERSON

RELATED APPLICATION

This application is a continuation of U.S. patent application Ser. No. 14/980,343, filed Dec. 28, 2015, which is a continuation of U.S. patent application Ser. No. 14/753,211, filed Jun. 29, 2015, which is a continuation of U.S. patent application Ser. No. 14/488,177, filed Sep. 16, 2014, and now U.S. Pat. No. 9,070,088. The entire disclosure of each of these related applications is hereby incorporated into this disclosure by reference.

BACKGROUND

This specification relates to determining the trustworthiness and compatibility of a person and, in particular, assessing behavioral and personality traits of a person.

Personality comprises the emotional and cognitive characteristic of a person. Behavior is how a person acts or reacts, sometimes toward another person, in a certain situation. A person with positive personality or behavior traits such as conscientiousness and openness, for example, is often perceived as more reliable and trustworthy. A person with negative personality or behavior traits such as neuroticism and involvement in crimes, for example, is often perceived as untrustworthy.

SUMMARY

In general, one aspect of the subject matter described in this specification can be embodied in methods that include the actions of obtaining a request for a trustworthiness score of a person from a requestor; identifying a plurality of documents; deriving one or more behavior trait metrics from analyzing a first plurality of the documents containing information relevant to assessing behavior of the person; deriving one or more personality trait metrics from analyzing a second plurality of the documents containing information relevant to assessing a personality of the person; providing the behavior trait metrics and the personality trait metrics as input to a scoring system and obtaining as output from the system a trustworthiness score of the person, wherein scoring system is rule based or a machine learning system; providing the trustworthiness score of the person to the requestor. The actions of obtaining, identifying, deriving and providing can be performed by one or more computer processors. Other embodiments of this aspect include corresponding systems, apparatus, and computer programs.

These and other aspects can optionally include one or more of the following features. The aspect can further comprise determining that trustworthiness score is not accurate, and retraining the scoring system to correct for the inaccuracy using the behavior trait metrics and the personality trait metrics. Determining that the trustworthiness score is not accurate can comprise receiving an indication of inaccuracy from the requestor, the person, a third party, a trained classifier, or a rule-based system. The trustworthiness score can be based on personality and behavior traits that predict the likelihood of the person being a positive actor in an online or offline person-to-person interaction. Deriving a particular behavior trait metric or a particular personality trait metric from analyzing a particular plurality of documents can comprise calculating a respective identity score for each of the particular plurality of documents, wherein the identity score is based on one or more identification attributes of the person that match identity information in the document, identifying content attributes in each one of the particular plurality of documents that occur in a respective dictionary or directory for the particular behavior or personality trait and calculating a respective initial score for the document based on, at least, weights associated with the identified content attributes and the identity score of the document, and combining the initial scores to calculate the particular behavior or personality trait metric for the person. A content attribute can be a word, phrase, image, tag, header, video, link, symbol, number, or connection to another individual or webpage. Weights can be determined based on rule based or machine based learning of the strength of the relationship between each content attribute and each personality or behavior trait. Identifying content attributes in a particular document can comprise identifying one or more portions of the document that contain text authored by the person or that provide information about the person. A particular identified portion can indicate that the person created a false or misleading online profile, provided false or misleading information to the service provider, is involved with drugs or alcohol, is involved with hate websites or organizations, is involved in sex work, perpetrated a crime, is involved in civil litigation, is a known fraudster or scammer, is involved in pornography, has authored online content with negative language, or has interests that indicate negative personality or behavior traits. The aspect can further comprise adding the trustworthiness score for the person to a database of trustworthiness scores for a plurality of different people. The aspect can further comprise receiving an indication that a second person trusts the person, creating a relationship between the second person and the person, and adjusting the trustworthiness score of the person based on, at least, the trustworthiness score of the second person. The aspect can further comprise obtaining identification attributes of the person, determining whether the identification attributes are authentic, deriving the one or more behavior and personality trait metrics if the identification attributes are authentic, and deriving additional identification attributes and iteratively deriving additional behavior and personality trait metrics based on the additional identification attributes. Determining whether the identification attributes are authentic can comprise determining if the person is associated with a fake social network profile. Determining whether the identification attributes are authentic can comprise determining if identity information about the person contained in one or more documents is consistent with the identification attributes. A particular personality trait can be badness, anti-social tendencies, goodness, conscientiousness, openness, extraversion, agreeableness, neuroticism, narcissism, Machiavellianism, or psychopathy. A particular behavior trait can be creating a false or misleading online profile, providing false or misleading information to the service provider, involvement with drugs or alcohol, involvement with hate websites or organizations, involvement in sex work, involvement in a crime, involvement in civil litigation, being a known fraudster or scammer, involvement in pornography, or authoring an online content with negative language. The identification attributes of the person can comprise a plurality of the following: name, email address, telephone number, geographic location, date of birth, social connections, employment history, education history, driver's license number, financial account information, Internet Protocol (IP) address, and device identifier. Identifying the documents can comprise formulating a plurality of queries using the personal identification attributes, the queries configured to maximize retrieval of relevant documents and information, submitting the queries to one or more remote systems, and receiving the search results from the remote systems in response to submitting the queries wherein each search result identifies a respective document in the plurality of documents. A particular document can be a web page, information from a database, a post on the person's social network account, a post on a blog or a microblog account of the person, a comment made by the person on a website, or a directory listing for a company or association.

Another aspect of the subject matter described in this specification can be embodied in a memory for storing data for access by a computer program being executed on one or more computer processes. The memory can comprise a data structure containing information stored in the memory. The data structure can be used by the computer program and can comprise a plurality of person data objects stored in the memory, each of the person data objects comprising a trustworthiness score, one or more behavior trait metrics, one or more personality trait metrics, and one or more compatibility scores between the person and one or more other persons, and a plurality of relationships between a plurality of the person data objects, wherein each of the relationships can comprise a link between a first user and a second user, and a weight of the link. Other embodiments of this aspect include corresponding systems, apparatus, and methods.

These and other aspects can optionally include one or more of the following features. A particular personality trait can be badness, anti-social tendencies, goodness, conscientiousness, openness, extraversion, agreeableness, neuroticism, narcissism, Machiavellianism, or psychopathy. A particular behavior trait can be creating a false or misleading online profile, providing false or misleading information to the service provider, involvement with drugs or alcohol, involvement with hate websites or organizations, involvement in sex work, involvement in a crime, involvement in civil litigation, being a known fraudster or scammer, involvement in pornography, or authoring an online content with negative language. A particular person data object can further comprise identification attributes of a person represented by the particular person data object. The identification attributes can comprise a plurality of the following: name, email address, telephone number, geographic location, date of birth, social connections, employment history, education history, driver's license number, financial account information, IP address, and device identifier. The trustworthiness score can be based on personality and behavior traits that predict the likelihood of the person being a positive actor in an online or offline person-to-person interaction. Each relationship can further comprise a calculated compatibility between the first user and the second user based on respective behavior and personality trait metrics of the first user and the second user. Each relationship can be determined by one or more online interactions between the first user and the second user.

Another aspect of the subject matter described in this specification can be embodied in methods that include the actions of obtaining a request for a compatibility score between two persons from a requestor; deriving one or more behavior trait metrics from analyzing a first plurality of documents containing information relevant to assessing respective behavior of a first person; deriving one or more personality trait metrics from analyzing a second plurality of documents containing information relevant to assessing respective personality of the first person; providing the behavior trait metrics and the personality trait metrics of the first person and corresponding metrics for a second person as input to a scoring system and obtaining as output from the system a compatibility score between the two persons; providing the compatibility score to the requestor. The actions of obtaining, identifying, deriving and providing can be performed by one or more computer processors. Other embodiments of this aspect include corresponding systems, apparatus, and computer programs.

Particular implementations of the subject matter described in this specification can be implemented to realize one or more of the following advantages. The system described here identifies documents related to a person, and derives behavior and personality trait metrics from analyzing the document for information relevant to assessing behavior and personality of the person. The system determines a trustworthiness score of the person based on the behavior and personality trait metrics using a machine learning system. The trustworthiness score can be used to predict whether a person would be a bad actor in an online or offline person-to-person interaction or would have negative comments written about them in an online community of users. Further embodiments utilize personality and/or behavior trait metrics to determine if two people are compatible with each other.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
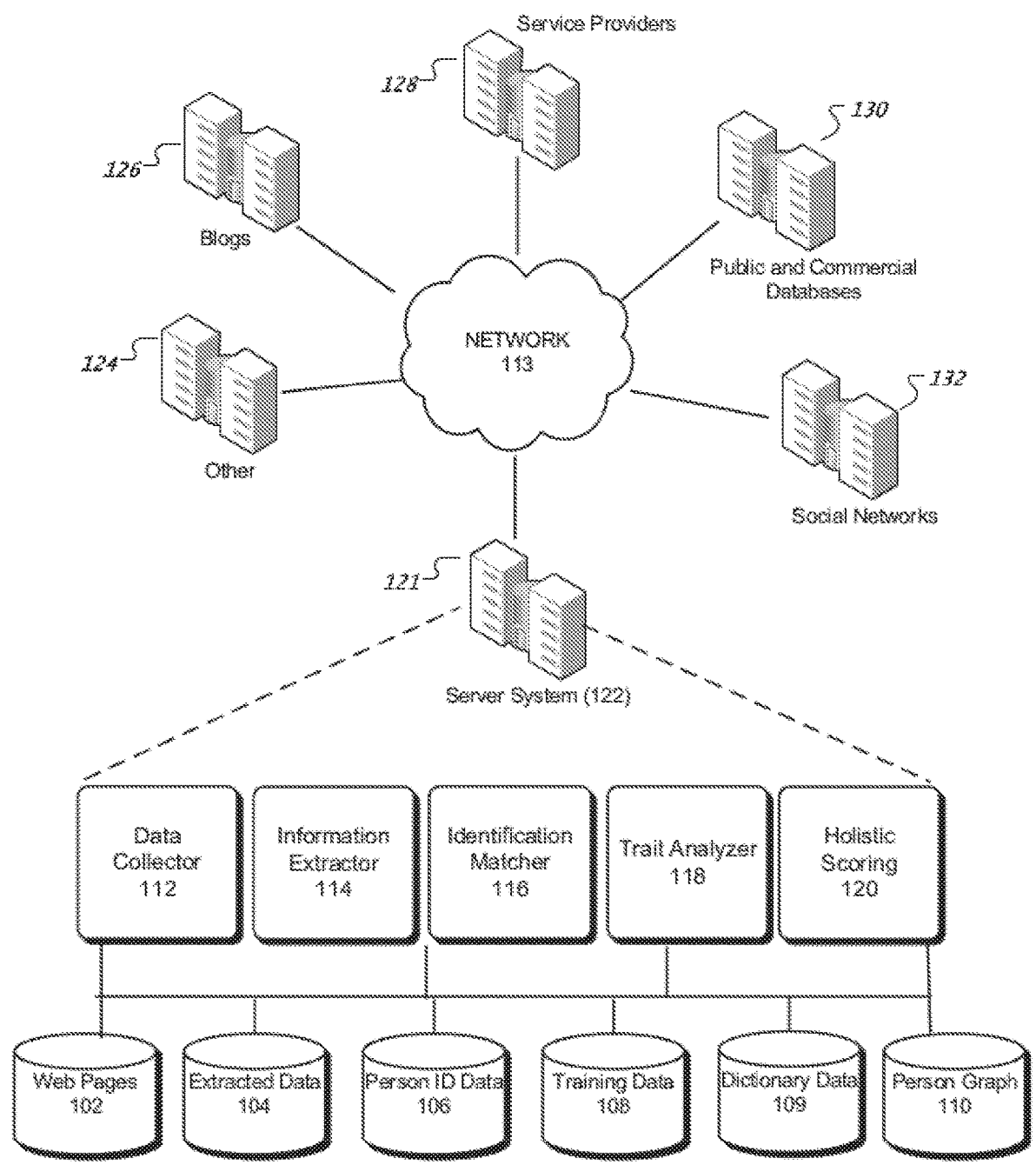
FIG. 1 illustrates an example system for determining the trustworthiness and compatibility of a person.

A service provider provides one or more services to users of the service provider. For example, a service provider can provide a ride-sharing service that facilitates between two or more users to share a car between two locations during a specified time period. As another example, a service provider can provide a short-term lodging arrangement service that facilitates a short-term rental agreement between a first user (e.g., a landlord) and a second user (e.g., a tenant). As another example, a service provider can provide financial products and services to the user. As a further example, a service provider can enable one user to provide babysitting or pet-boarding services to a second user. By way of illustration, a user can sign up with a service provider by providing the service provider identification information such as a name, email address, and phone number, for example. A user can interact with a service provider and other users of the service provider through the service provider's website, or through a special-purpose application on the user's client device (e.g., a mobile application on a smartphone or other data processing apparatus).

It is desirable for a service provider to identify a person who may affect the service provider's business or user experience for users of the service provider, more particularly, by identifying the person's personality or behavior traits that may affect user experience for users of the service provider. For example, a person with an unstable personality or having demonstrated a behavior of making demeaning comments may make other users feel uncomfortable while sharing a ride with the person. On the other hand, a person with an honest or outgoing personality may be a pleasant companion for other users sharing a ride with the person.

A service provider can identify a person's personality or behavior traits that may be useful for various aspects of its services. For example, a financial service provider (e.g., an online payment service) can include a person's involvement in (or lack of) criminal activities in the risk calculation of the person. A matchmaking service provider can recommend a connection between two persons if they have similar personality traits (e.g., they may have compatible personalities). A recruiting service can identify a candidate for an opportunity based on the candidate's desirable personality or behavior traits, for instance.

Particular implementations of the subject matter described in this specification describe methods for determining a person's personality or behavior traits, and determining trustworthiness or compatibility scores of the person. The trustworthiness score of the person can be based on personality and behavior traits that predict the likelihood of the person being a positive actor in an online or offline person-to-person interaction. Personality traits can include badness, anti-social tendencies, goodness, conscientiousness, openness, extraversion, agreeableness, neuroticism, narcissism, Machiavellianism, and psychopathy. Other personality traits are possible. Behavior traits can include creating a false or misleading online profile, providing false or misleading information to the service provider, involvement with drugs or alcohol, involvement with hate websites or organizations, involvement in sex work, involvement in a crime, involvement in civil litigation, being a known fraudster or scammer, involvement in pornography, or authoring an online content with negative language. Other behavior traits are possible.

FIG. 1 illustrates an example system for determining the trustworthiness and compatibility of a person. A server system 122 provides functionality for determining the trustworthiness of a person. The server system 122 comprises software components and databases that can be deployed at one or more data centers 121 in one or more geographic locations, for example. The server system 122 software components comprise a data collector 112, information extractor 114, identification matcher 116, trait analyzers 118, and holistic scoring 120. The software components can comprise subcomponents that can execute on the same or on different individual data processing apparatus. The server system 122 databases comprise a web pages database 102, extracted data database 104, person identification (ID) data database 106, training data database 108, dictionary data database 109, and person graph database 110. The databases can reside in one or more physical storage systems. The software components and data will be further described below.

The data collector 112 is a software component that, based on identification attributes of a person, identifies a plurality of documents related to the person. The identification attributes can include one or more of the following information about the person: name, email address(es), telephone number(s), geographic location, date of birth, driver's license number, and financial account information. The identification attributes can also include Internet Protocol (IP) addresses and device identifiers (e.g., universally unique identifier or UUID) of devices that the person uses. Other identification attributes are possible. The identification attributes of the person are stored in person ID data database 106. Electronic documents (or "documents") related to the person can include web pages, information from databases, posts on the person's social network account, posts on a blog or a microblog account of the person, a comment made by the person on a website, or a directory listing for a company or association. Other types of documents are possible. The data collector 112 can access servers of social networks 132, public and commercial databases 130, blogs and microblogs services 126, or other servers 124 through one or more data communication networks 113 such as the Internet, for example, and retrieve documents related to the person.

The identification attributes of the person can be provided by a service provider, for example, when the service provider requests the server system 122 to determining the trustworthiness of the person. The data collector 112 can receive a request including the identification attributes of the person from servers of the service provider 128 through the network 113, for example. The identification attributes of the person can also be provided by the person himself or herself, for example, by filling out an online form hosted by the server system 122. In some implementations, the data collector 112 (or another software component of the server system 122) can verify that the requestor (e.g., the service provider or the person) is authorized to receive the trustworthiness information of the person (e.g., by examining credentials that may have been previously provided).

By way of illustration, the data collector 112 can access servers of social networks 132 (e.g., Facebook, LinkedIn) for posts on the person's social network accounts and can access servers of public and commercial databases 130 (e.g., Pipl, LexisNexis) for information related to the person (e.g., public records such as marriage certificates, property records, or arrest reports). Public and commercial database 130 can be structured databases that are accessed through structured queries or application program interfaces (APIs), for example, and provide information related to the person in a structured format (e.g., in JavaScript Object Notation or JSON format). The data collector 112 can access servers of blog and microblog services 126 (e.g., Blogger, Twitter) for the person's posts on blog or microblog accounts. The data collector 112 can access other servers 124 hosting web pages containing information related to the person. Web pages containing information related to the person can include articles from a news source (e.g., Washington Post), posts and comments by or about the person (e.g., a video posted by the person, a comment by the person on an article, a video or a comment that the person is tagged in), search results from search engines (e.g., Google, Yahoo!) and directories (e.g., white pages). The data collector 112 can access the documents related to the person through data feeds such as web feeds (e.g., a Really Simple Syndication or RSS feed) hosted by other servers 124 or blogs servers 126 that aggregate blog posts or news articles related to the person. The documents related to the person identified and retrieved by the data collector 112 are stored in web pages database 102. The data collector 112 is further described with reference to FIG. 3.

The information extractor 114 is a software component that extracts information relevant to assessing behavior and personality traits of the person from the documents obtained by the data collector 112. For instance, in a web page including a news article, one comment by the person, and ten comments by other individuals, the information extractor 114 extracts the one comment by the person from the web page and discards other content of the web page. The information extractor 114 stores the extracted data in the extracted data database 104. The information extractor 114 also extracts identity information from the documents. The information extractor 114 is further described with reference to FIG. 4.

The identification matcher 116 is a software component that calculates identity scores for the documents obtained by the data collector 112. The identity scores measure how closely each of the documents is related to the person. For each particular one of the documents, the identification matcher 116 calculates an identity score for the particular document based on uniqueness of the identity information found in the particular document and how well the identity information matches the identification attributes of the person stored in person ID data database 106. In addition, the identification matcher 166 can add new identity information found in the particular document to the identification attributes of the person stored in person ID data database 106 with an associated confidence score, if the identity score of the particular document exceeds a pre-determined threshold (i.e., if the identification matcher 166 is fairly certain that the identity information found in the particular document matches the person). The identification matcher 116 is further described with reference to FIG. 5.

The trait analyzer 118 is a software component that analyzes extracted data (stored in the extracted data database 104) from the documents obtained by the data collector 112 to derive behavior and personality traits of the person. The trait analyzer 118 searches for one or more content attributes in the extracted data, and looks up the content attributes in dictionaries for behavior and personality traits. Content attributes can be words, phrases, images, tags, header, videos, links, numbers, or connections (e.g., hyperlinks) to another individual or webpage. The dictionaries for behavior and personality traits consist of words, phrases, images, numbers, links, videos, tags, headers or combinations of them along with weights and are stored in dictionary data database 109. In some implementations, the trait analyzer 118 can look up the content attributes in one or more directories that are hosted by one or more remote systems. For each particular one of the documents, the trait analyzer 118 identifies content attributes (e.g., swear words or phrases that express negative emotion) in extracted data of the particular document that occurs in a dictionary for a particular behavior or personality trait (e.g., extraversion), and calculates an initial score as weighted by the identity score of the particular document, and weights of the words in the dictionary. For each particular one of behavior or personality traits, the trait analyzer 118 combines the initial scores (e.g., for multiple documents) and calculates the particular behavior or personality trait metric for the person. The trait analyzer 118 is further described with reference to FIG. 6.

The holistic scoring 120 is a software component that inputs the behavior and personality trait metrics for the person into a rule based system, a machine learned system, or both and obtains the output from the system as a trustworthiness score of the person. The holistic scoring 120 can use training data stored in training data database 108 to train one or more algorithms used to calculate trustworthiness and compatibility scores. The trustworthiness scores (i.e., output of the holistic scoring 120) can be calibrated with other data such as actual feedback about the person from other users or the service provider. For instance, the person may have a high trustworthiness score initially. However, if feedback from the service provider, the person, a third party, or other data indicates that the person is not trustworthy (i.e., the trustworthiness score is inaccurate) or that a compatibility score is inaccurate, the holistic scoring 120 can use the person's data (e.g., the person's behavior and personality trait metrics, or how data was collected and extracted for the person) as training data to further train the machine learning algorithms or adjust metric score weights used in rules to calculate trustworthiness scores. (Rules are described further below.) In further implementations, inaccurate trustworthiness or compatibility scores can be detected automatically using rules which identify anomalies in metric scores or by using a classifier that is trained to detect inaccurate scores.

By way of illustration, training data can comprise a set of tuples where each tuple comprises a collection of behavior and personality trait metric scores which serve as input to the holistic scoring 120 and the trustworthiness score that should be the output of the system given the input. The set of training tuples can be modified over time to reflect feedback from service providers and/or users regarding trustworthiness scores that were not predictive or accurate.

Examples of machine learning systems that can be used for the holistic scoring 120 include supervised learning systems (e.g., regression trees, random forests), unsupervised learning systems (e.g., k-means clustering), support vector machines, kernel method, and Bayesian networks (probabilistic directed acyclic graphic model). Other machine learning systems are possible.

In various implementations, the holistic scoring 120 generates a trustworthiness score of the person using rules. The rules specify weights to be applied to the trait metrics and how the trait metrics should be combined (e.g., weighted average, weighted sum, and so on) For instance, the rules can weight one or more particular trait metrics higher than other behavior and personality trait metrics. By way of illustration, trait metrics for conscientiousness, psychopathy, and agreeableness can be weighted higher than other behavior and personality trait metrics. As another example, the rules can assign all weights (one hundred percent) to trait metrics for behavior of involvement of crimes and sex work. In one implementation, the rules can assign equal weight to each of the behavior and personality trait metrics. Other methods for generating a trustworthiness score of the person are possible.

In addition to the holistic scoring 120, software components data collector 112, information extractor 114, identification matcher 116, and trait analyzer 118 can utilize one or more machine learning systems. The holistic scoring 120 can use training data stored in the training data database 108 to train rule based and machine learning algorithms used to calculate identity scores, calculate weights assigned to content attributes, develop trait metrics, or extract data from documents related to the person.

The trustworthiness scores and behavior and personality trait metrics can be stored in the person graph database 110.

For instance, the person graph database 110 can maintain a data structure including a plurality of person data objects. Each person data object corresponds to a person and includes the person's identification attributes, a trustworthiness score, compatibility scores between the person and one or more other people, one or more behavior trait metrics, and one or more personality trait metrics, as determined by the software components of the server system 122. The data structure also includes a plurality of links between person data objects. Each link represents a relationship between a first person and a second person, and includes a weight indicating the strength of the relationship. A relationship between two persons and the weight of the relationship can be obtained by inspecting, for example, the two persons' social networking accounts or other online interactions between the two persons. For example, how often they have posted on each other's profiles or timelines, how recently they have done so, how long they have been connected on the social network, how many friends, followers or connections they share in common, whether they share a last name, address, phone number, email, and so on.

The holistic scoring 120 can adjust the person's trustworthiness scores based on the person's particular friend's respective trustworthiness score, for example, if the relationship strength between the person and the particular friend exceeds a pre-determined threshold. In some implementations, this can be modeled as propagation through a Markov network where the strength of link is calculated using features that indicated the weight of a relationship (e.g., as described in the previous paragraph). In another implementation, this can be modeled as the weighted sum of the trustworthiness of the person's friends, weighted by how many degrees each the friend is from the person.

In addition to determining trustworthiness of a person, the holistic scoring 120 can determine compatibility between two persons based on their respective behavior and personality trait metrics. For instance, a large difference (e.g., greater than 30 percent) in the openness personality trait metrics can indicate low compatibility between the two persons. The holistic scoring 120 can calculate a compatibility score between two persons. The system can use training data stored in the training database 108 to train one or more algorithms used to calculate a compatibility score between two persons based on respective behavior and personality trait metrics for the two persons. By way of illustration, training data can comprise a set of tuples wherein each tuple comprises a collection of behavior and personality trait metric scores which serve as input to the holistic scoring 120 and the compatibility score that should be the output of the system given the input. The set of training tuples can be modified overtime to reflect feedback from service providers and/or users regarding compatibility scores that were not predictive or accurate. In other implementations, the holistic scoring 120 can calculate a compatibility score between two persons using rules or table look-ups. For instance, for a dating website, the holistic scoring 120 can assign a perfect compatibility score (e.g., 1.0) if differences between respective trait metrics between two persons for a particular set of behavior and personality traits (e.g., goodness, openness, dog loving) are within five percent. The holistic scoring 120 can assign a high compatibility score (e.g., 0.8) if the differences are within ten percent, for instance. The holistic scoring 120 can assign a low compatibility score (e.g., 0.3) if the differences exceed thirty percent. In one implementation, a particular set of behavior and personality traits can be represented in a feature space. Each person's behavior and personality trait metric can be represented by a feature vector in the feature space. A compatibility score can be determined by how closely the feature vectors of the two persons are aligned in the feature space or as the cosine distance between the two vectors. Other methods for calculating a compatibility score between two persons are possible.

Figure 2:
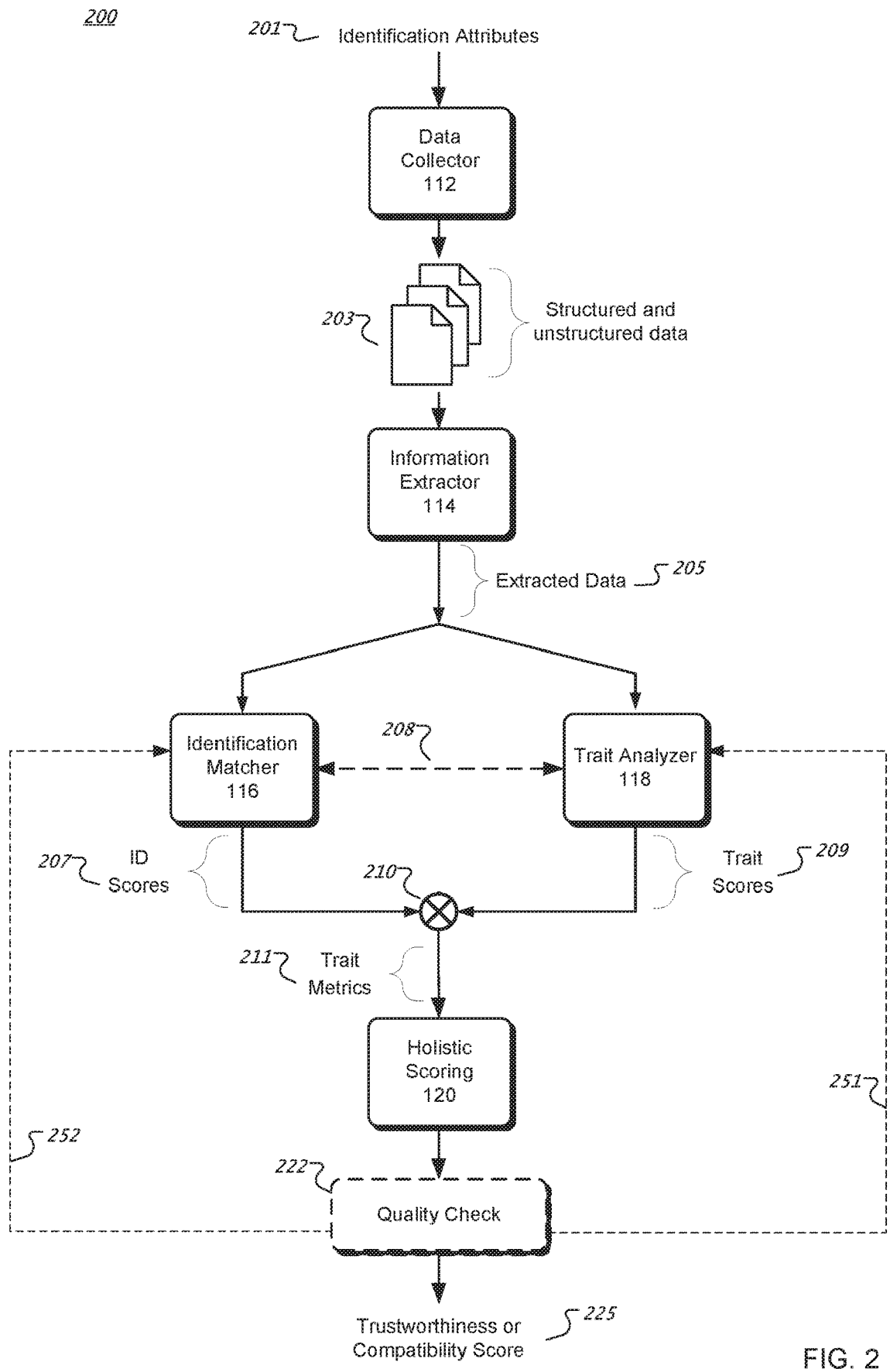
FIG. 2 is an example data flow diagram of a system for determining trustworthiness and compatibility of a person.

FIG. 2 is an example data flow diagram of the system illustrated in FIG. 1. The data collector 112, based on the person's identification attributes 201, obtains the documents related to the person. The documents include structured and unstructured data 203. The information extractor 114 extracts information relevant to assessing behavior and personality traits of the person from the structured and unstructured data 203 of the documents obtained by the data collector 112. Extracted data 205 is then passed to the identification matcher 116 and trait analyzer 118.

Using the extracted data 205, the identification matcher 116 calculates respective identity scores 207 for the documents obtained by the data collector 112. Using the extracted data 205, the trait analyzer 118 first calculates initial trait scores 209 by performing dictionary look-up, then weighting (210) the initial trait scores 209 by the identity scores 207 to calculate behavior and personality trait metrics 211. In addition, as indicated by the arrows 208, the identification matcher 116 can analyze identity information and calculate identity scores for the documents obtained by the data collector 112 based on particular traits being analyzed by the trait analyzer 118. The trait analyzer 118 can analyze the person's traits and calculate initial trait scores 209 based on the identity scores provided by the identification matcher 116. The holistic scoring 120 then uses the behavior and personality trait metrics 211 as input to a machine learning system and obtains the output from the machine learning system as the trustworthiness score 225.

In some implementations, at least some of the outputs from the holistic scoring 120 and software components 112, 114, 116, and 118 are examined in a quality check step 222, before the trustworthiness score is determined. The quality check step 222 can be performed by an individual (e.g., a data analyst hired for this step, an individual at the service provider who reviews the output in order to provide periodic feedback, or the subject of the output itself), or a software component of the server system 122 based on a set of pre-determined rules. The results of this quality check step 222 are fed back as training data for the holistic scoring 120 used by the identification matcher 116 and trait analyzer 118, as described in more detail with reference to FIG. 5 and FIG. 6.

Figure 3:
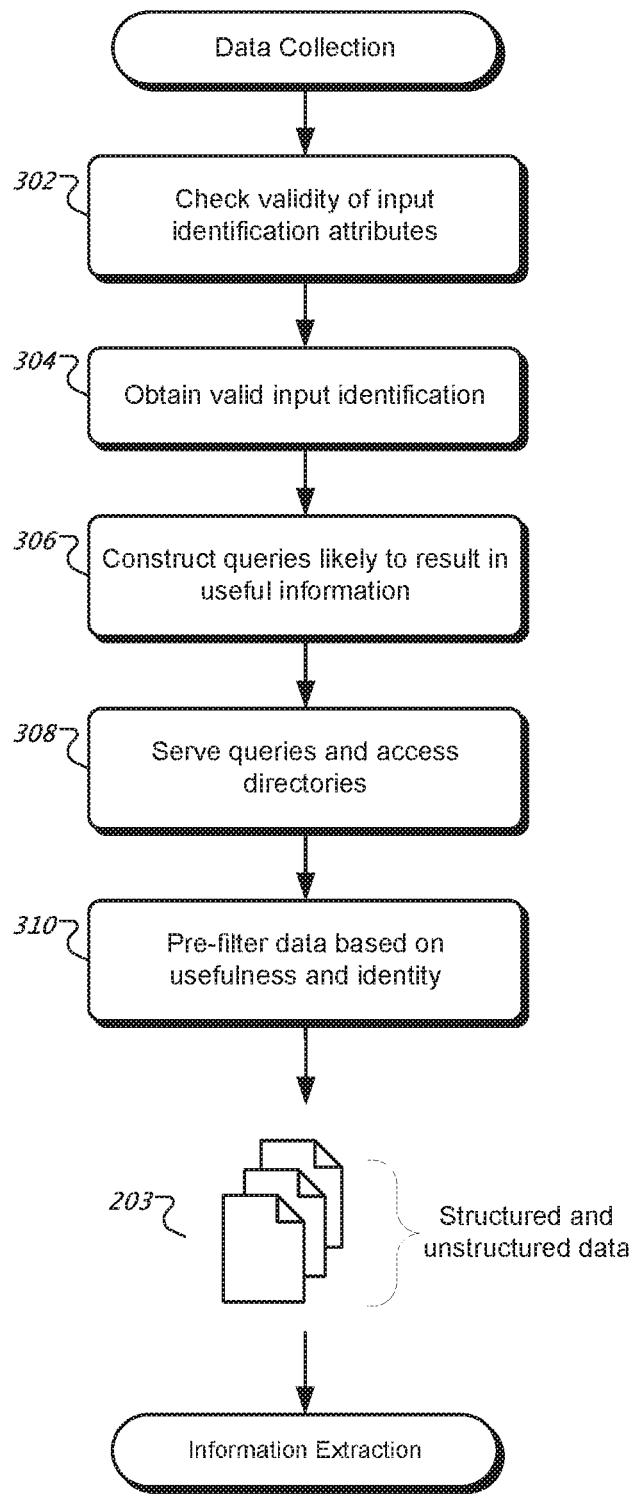
FIG. 3 is a flow chart of an example method for identifying and accessing documents related to a person.

FIG. 3 is a flow chart of an example method for identifying and accessing documents related to a person. The method can be one implementation of the functionality of the data collector 112 that identifies and obtains a plurality of documents related to a person based on identification attributes of the person. The method starts at 302, where the data collector 112 checks for validity and authenticity of input identification attributes of a person. As described earlier, the input identification attributes can be provided by a service provider that requests the server system 122 for determining trustworthiness of the person. The data collector can determine whether the input identification attributes contain invalid data such as fake or unreal names (e.g., "None of Your Business"), phone numbers (e.g., "555-1212"), or addresses (e.g., "1600 Pennsylvania Ave NW, Washington D.C."), for example. The data collector 112 can also determine whether the input identification attributes contain invalid data such phone numbers or zip codes that have wrong number of digits, or non-existing cities. The data collector 112 can determine invalid input identification attributes by checking whether the input identification attributes are associated with a fake social network profile (e.g., a profile with less than 3 posts or with zero friend, incomplete fields, or an aggregated incompleteness of the profile). The data collector 112 can identify a fake input identification attribute (e.g., an email address) if the input identification attribute has been determined (e.g., by the identification matcher 116) to belong to another individual. In some implementations, the authenticity of the input data is determined by checking information gathered by the information extractor 114 whether the totality of the input data can be determined to be consistent (e.g. is there evidence that a particular email address, name, location and age are all connected to each other). In some implementations, if fake data is found, the data collector 112 (or another software component of the server system 122) can stop evaluating behavior or personality traits and trustworthiness of the person since the person is apparently not trustworthy, and directly assign a low trustworthiness score for the person.

The data collector 112 then obtains a set of valid input identification attributes of the person (304), for example, by discarding invalid input identification attributes. The data collector 112 can provide feedback (e.g., an error message) to the service provider and request valid identification attributes of the person.

Based on the valid input identification attributes, the data collector 112 constructs multiple queries that are likely to result in useful information for determining trustworthiness of the person (306). For instance, the data collector 112 can construct queries using names, email addresses, email handles, or zip codes from the input identification attributes. Here, a particular query may be more useful if the particular query contains more unique data or can yield less irrelevant results. For instance, a query with the person's name including a middle initial or middle name may yield more specific results about the person. A query including the person's name and city and state data can be better than another query including the person's name and zip code, since the zip code may yield irrelevant results having any numbers (e.g., phone numbers, street numbers, or International Standard Book Number or ISBN numbers) including the 5 digits of the zip code.

In some implementations, keywords in addition to one or more of the input identification attributes are included in queries. For instance, the data collector 112 can construct a query including the person's first name, last name, city, and a keyword "crime" such that search results from the query can be narrowed to crime-related activities (if any) of the person.

The data collector 112 can use previously created directories of reliable data sources (e.g., commercial and public databases, websites) most likely to result in useful information based on the request of the service provider. For instance, if the request is about behavior traits of involvement of crimes, the data collector 112 can use previously constructed directories including databases to query for arrest reports, and local newspaper websites that may have crime news near the person's geographic location. For another instance, if the request is about personality traits (e.g., goodness, openness, anti-social tendencies, neuroticism), the data collector 112 can use previously constructed directories including social networks that likely contain comments and posts authored by the person.

Queries for the same person can be constructed differently for different directories to optimize search results since different directories may have different querying and ranking mechanisms. In addition, multiple queries for the same person can be constructed for a same directory to maximize search results such as maximizing the number of relevant results from searches from the directory. For instance, an initial query including the person's first name, last name, and city can be constructed and submitted to a search engine. If search results from the initial query are not satisfactory (e.g., not enough identity information) or even otherwise, additional queries including further identification attributes (e.g., email handle) can be constructed to yield better search results. Additional queries can be constructed iteratively until satisfactory search results are obtained.

The data collector 112 then submits the queries to one or more remote systems (e.g., search engines) and the directories to retrieve documents that are related to the person (308). The data collector 112 pre-filters data in the retrieved documents based on usefulness and identity (310). For instance, the data collector 112 can pre-filter data by discarding data from particular websites or domains that tend to provide useless results. For example, a genealogy website can yield a list of the same names without any additional information about the person. The structured and unstructured data from the filtered documents obtained by the data collector 112 then is used for information extraction by the information extractor 114, as described in further detail with reference to FIG. 4 below.

Figure 4:
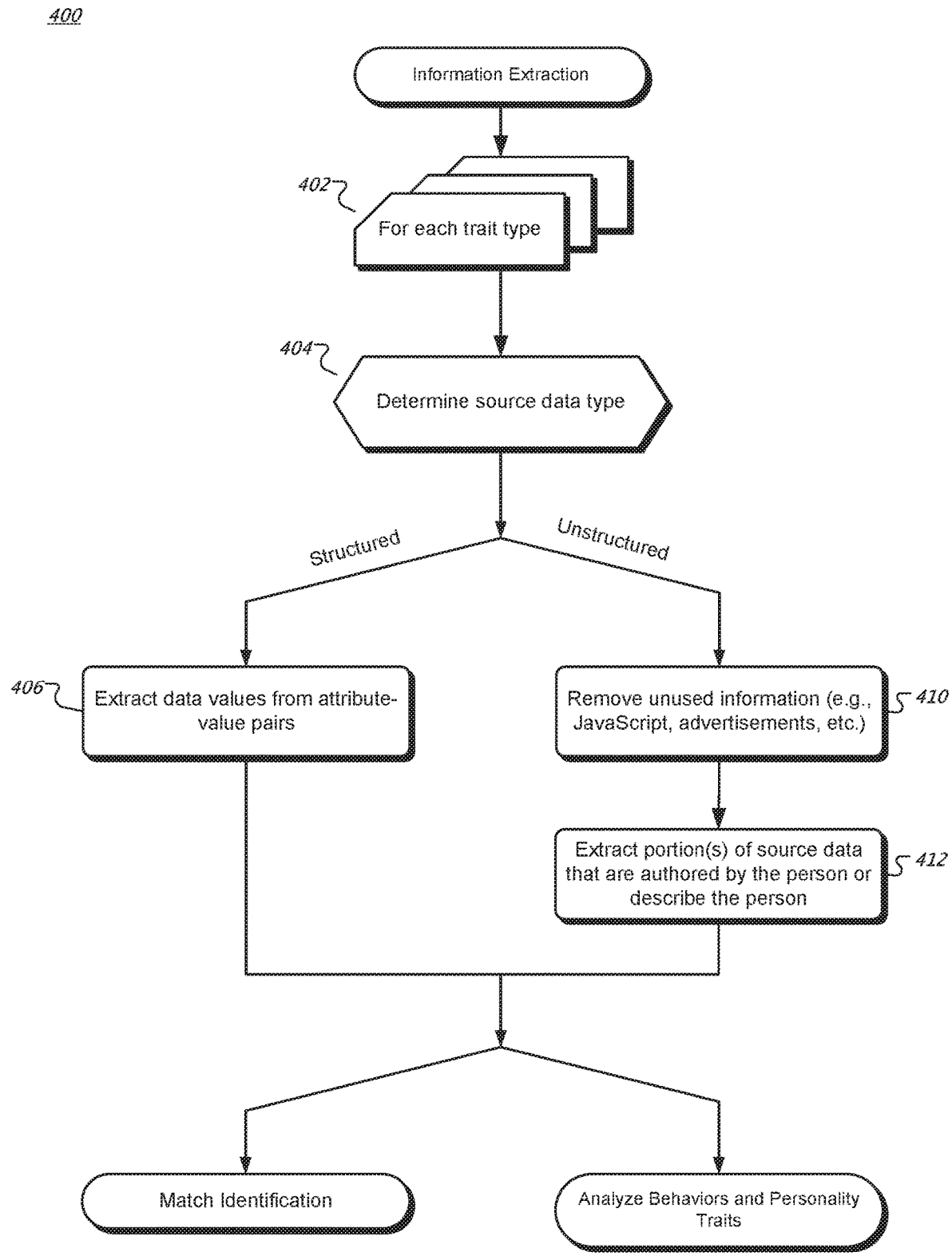
FIG. 4 is a flow chart of an example method for extracting from documents information relevant to assessing behavior and personality traits of the person.

FIG. 4 is a flow chart of an example method for extracting from documents related to a person information relevant to assessing behavior and personality traits of the person. The method can be one implementation of the functionality of the information extractor 114 that extracts behavior and personality information from the documents obtained by the data collector 112. The method starts at 402, where the information extractor 114 extracts behavior and personality information for each behavior or personality trait (402). For each behavior or personality trait, the information extractor 114 determines whether the data is structured or unstructured (404).

If the data is structured (e.g., from a structured database), the information extractor 114 extracts information from the structured data, for example, by extracting data values from attribute-value pairs (tuples) in the structured data (406). If the data is unstructured (e.g., from a web page), the information extractor 114 removes unused information from the unstructured data (410). For instance, the information extractor 114 can remove advertisements, JavaScript software code, or programmer comments from the unstructured data. The information extractor 114 then extracts one or more portions of the unstructured data that are authored by the person or describe the person (412). The information extractor 114 can determine whether the person is an author or the main subject of the data by inspecting the uniform resource locators (URLs) of the documents for the person's name or other identifiers. The information extractor 114 can also inspect user, author, title, or header fields in the documents, more particularly, in documents such as profile pages, blogs, or online comments and posts.

The information extractor 114 can extract a portion of the unstructured data related to the person by extracting content bounded by delimiters. The delimiters can be punctuation marks for complete or partial sentences (e.g., periods, semicolons), or embedded tags (e.g., div, section, video).

The extent of the data extracted from the unstructured data can depend on the type of behavior or personality trait and/or the identity score. For instance, for a personality trait such as goodness or anti-social behavior, data authored by the person may be more useful. The information extractor 114 can extract from the unstructured data a comment or an article by the person (e.g., a section following the person's name in the unstructured data). For another instance, for a behavior trait such as involvement in crimes, it is necessary to ensure that data extracted describes the person, not some other individuals or crimes not related to the person. In this instance, the information extractor 114 can find the person's name in the unstructured data (e.g., from a news article), and extract only one sentence before and one sentence after the person's name from the unstructured data.

The extracted data from structured or unstructured data can include additional identity information. For instance, the structured data may be the result from accessing a database (e.g., Pipl) with a query including first and last name of the person. The results can include additional identity information such as birth date, city, state, and phone number. The identity information found may or may not match exactly the input identification attributes of the person (e.g., same city and state but different street address). Additional identity information can also include the person's social connections, employment history, education history, and association with organizations. Other additional identity information is possible. Similarly for the input identification attributes, the information extractor 114 can verify whether the identity information is valid and authentic (e.g., by examining whether it is a fake phone number or address, or whether it is associated with a fake social network profile).

If a particular input identification attribute does not have matching identity information found from the documents obtained by the data collector 112, the information extractor 114 may determine that the particular input identification attribute is not authentic or not valid. The information extractor can send a report or error message to the service provider (or the person) requesting for determining trustworthiness of the person.

In some implementations, the information extractor 114 determines and labels types of extracted data from a particular document based on, for example, content or origin of the particular documents. For instance, the information extractor 114 can determines the extracted data is related to crimes if the particular document is retrieved from a crime report database. The information extractor 114 can determines the extracted data is related to pornography or sex work based on contents (e.g., images, words, links) of the particular document, or the URL of the particular document.

The data extracted by the information extractor 114 then is used for matching identification and analyzing behavior and personality traits by the identification matcher 116 and trait analyzer 118, as described in more detail with reference to FIG. 5 and FIG. 6 below.

Figure 5:
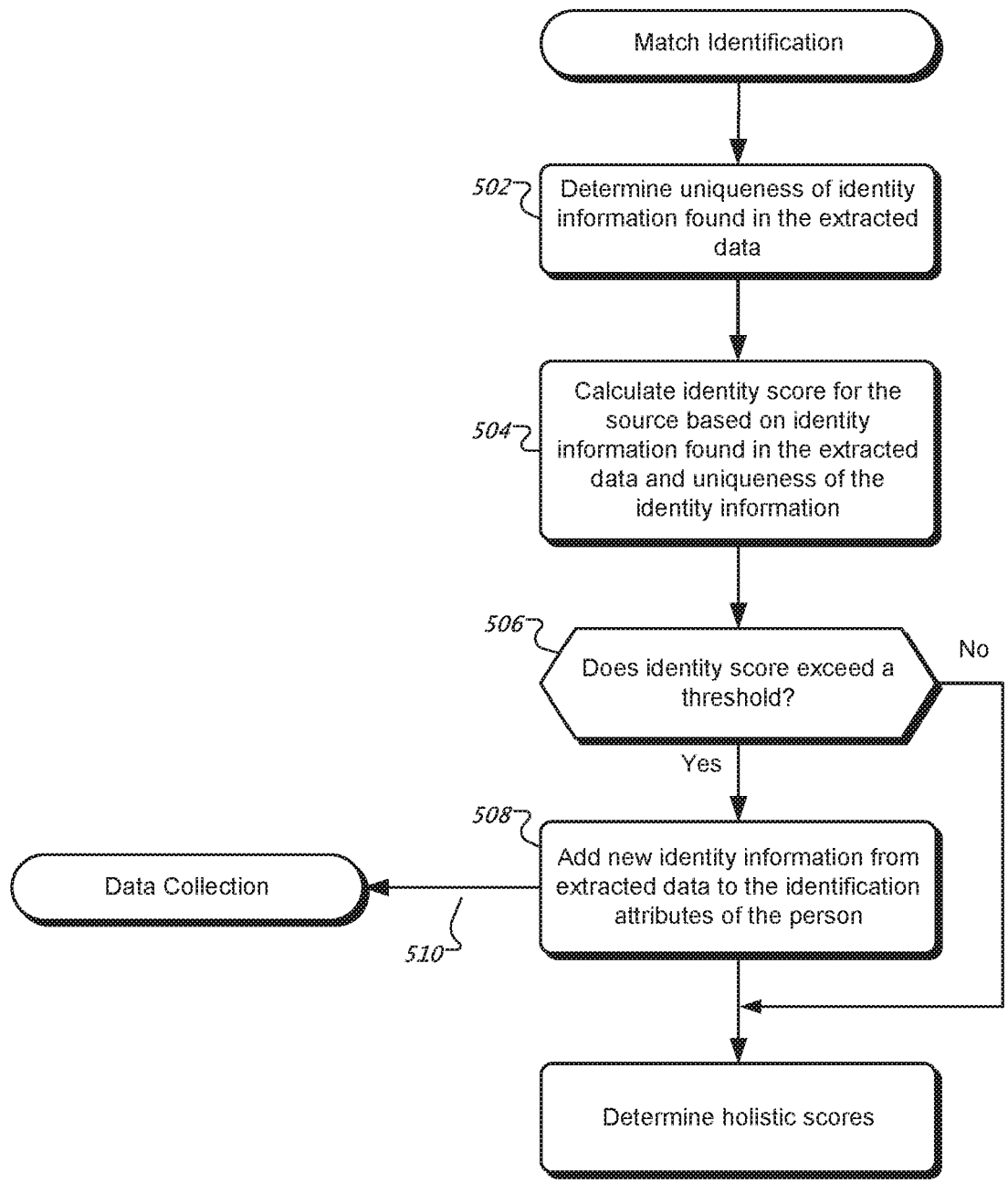
FIG. 5 is a flow chart of an example method for calculating identity scores for documents related to a person.

FIG. 5 is a flow chart of an example method for calculating identity scores for documents related to a person. The method can be one implementation of the functionality of the identification matcher 116. The method starts at 502, where for each particular document obtained by the data collector 112, the identification matcher 116 determines uniqueness of identity information found in the extracted data of the particular document. For instance, an email handle "johnsmiththeflyingdragon" is more unique than another email handle "john.smith" or a name "John Smith." More unique identity information indicates that it is more likely the particular document is more closely related to the person. For instance, the person may have a name "John Smith" and an email handle "johnsmiththeflyingdragon." A profile page for a user name "johnsmiththeflyingdragon" or "John Smith the Flying Dragon" from a social network is more likely to be the person's profile page, than another profile page for a user name "John Smith" from the social network.

The identification matcher 116 can obtain identity information from the extracted data of the particular document based on the type of the particular document, and based on a particular behavior or personality being evaluated. For instance, the identification matcher 116 can look for new identity information in the entire extracted data of the particular document if the particular document is a profile page of the person. For the behavior traits of involvement in crimes, the identification matcher 116 can look for new identity information in a small portion (e.g., one sentence before and after) in the particular document that includes a known identity attribute of the person.

The identification matcher 116 calculates an identity score for the particular document based on identity information found in the extracted data from the particular document, and based on the uniqueness of the identity information found (504). By way of illustration, the identity score can be a value from 0.0 and 1.0. A value of 1.0 indicates that the particular document matches the person. A value of 0.0 indicates that the particular document does not match the person. A value between 1.0 and 0.0 (exclusively) indicates that the particular document more or less matches the person. For instance, if a full name found from the particular document has a different middle name than the person's middle name, the identification matcher 116 can assign an identity score of 0.1 to the particular document, since the particular document is unlikely to be related to the person. If a unique identity information found in the particular document (e.g., "johnsmiththeflyingdragon" described above) is the same as an input identification attribute of the person, the identification matcher 116 can assign an identity score of 0.9 to the particular document since the particular document is very likely to be related to the person.

The identification matcher 116 can assign an identity score to the particular document if the identity information found from the particular document is not the same as but close to the input identification attributes of the person. For instance, if a birth date found from the particular document has no year information but has the same month and date as in the person's birth date in the input identification attributes, the identification matcher 116 can assign an identity score of 0.7 to the particular document. The identification matcher 116 can assign an identity score of 0.0 to the particular document if a birth date found from the particular document is different more than a year from the person's birth date in the input identification attributes. For another example, if a geographic location (e.g., city and state) found from the particular document is not the same but within 10 miles from the person's geographic location in the input identification attributes, the identification matcher 116 can assign an identity score of 0.8 to the particular document. If the geographic information found from the particular document is not the same but within 50 miles from the person's geographic location in the input identification attributes, the identification matcher 116 can assign an identity score of 0.4 to the particular document. If the geographic information found from the particular document (e.g., Los Angeles) is part of the person's geographic location in the input identification attributes (e.g., California), the identification matcher 116 can assign an identity score of 0.6 to the particular document. The identification matcher 166 can assign an identity score of 0.0 to the particular document if a geographic location found from the particular document is in a different time zone from the person's geographic location in the input identification attributes.

For new identity information found from the particular document, the identification matcher 116 can determine whether the identity score for the particular document exceeds a pre-determined threshold (506). If the identity score exceeds the threshold (e.g., 0.67), the identity matcher 116 adds the new identity information to the person's identification attributes stored in person ID data database 106 (508). In some implementations, the new identity information is added to the person's identification attributes together with the identity score, regardless the value of the identity score. In this way, information such as behavior and personality traits derived from documents with the new identity information (new identification attributes) can be weighted by the identity score.

The identification matcher 116 can repeat the steps of FIG. 5 for some or all of the documents obtained by the data collector 112. For new identity information found from multiple documents obtained by the data collector 112, the identification matcher 116 can determine whether the average identity score exceeds a pre-determined threshold. If the average identity score exceeds the threshold, the identity matcher 116 adds the new identity information to the person's identification attributes stored in person ID data database 106.

For each new identity information (e.g., a new email handler), the new identity information can be provided for additional data collection, as indicated by the arrow 510. That is, as described earlier with reference to FIGS. 3-5, the new identity information is used to identity and access a new set of documents related to the person. Information relevant to assessing behavior and personality traits of the person is extracted from these documents, and is used for further matching identification and analyzing behavior and personality traits. The loop-back of 510 can repeat until no more new identity information is found.

The identity scores calculated by the identification matcher 116 for the documents obtained by the data collector 112 then is used for determining holistic scores, as described in further detail below.

Figure 6:
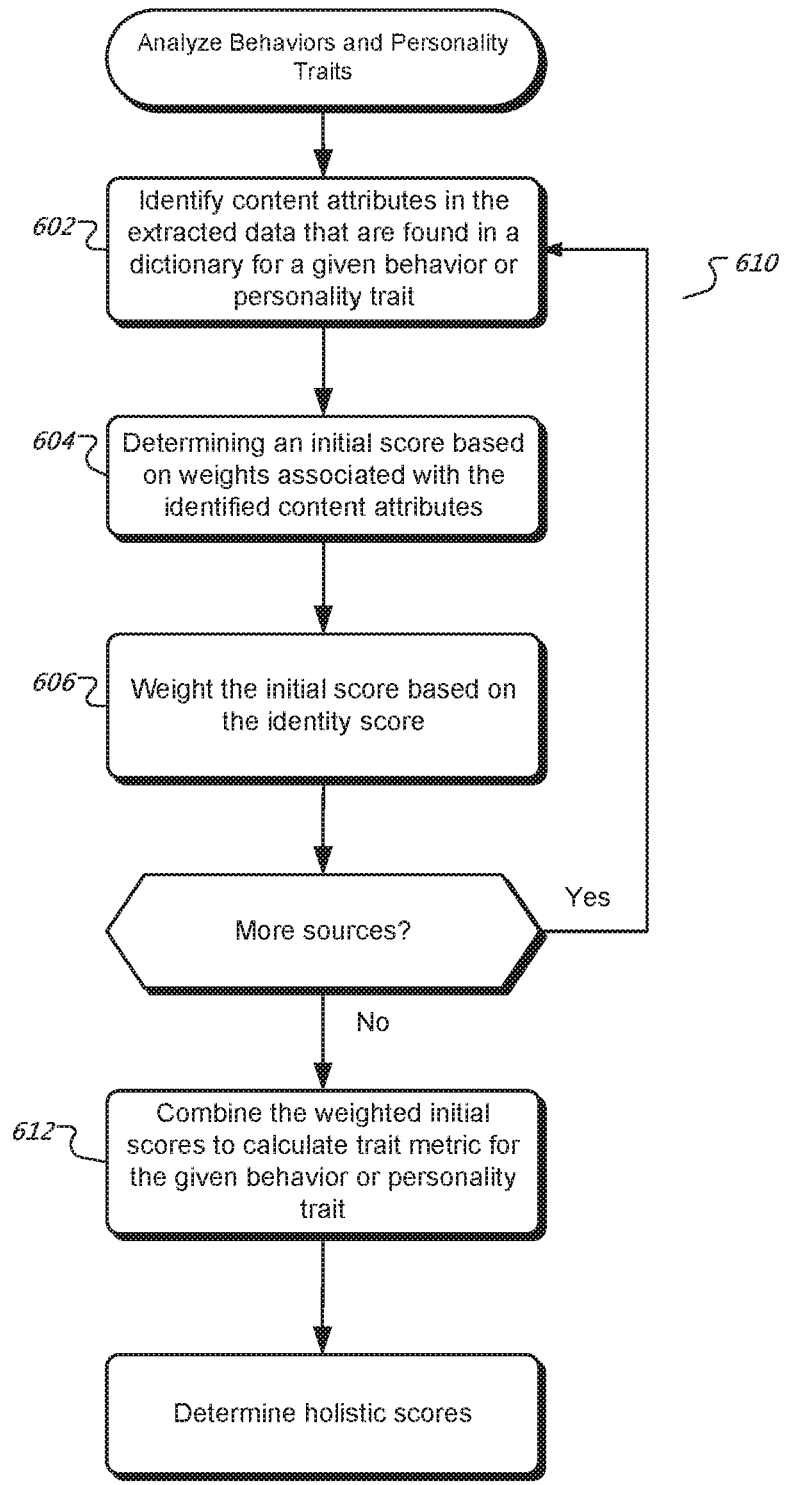
FIG. 6 is a flow chart of an example method for analyzing extracted data from documents related to a person for behavior and personality traits of the person.

FIG. 6 is a flow chart of an example method for analyzing extracted data from documents related to a person for behavior and personality traits of the person. The method can be one implementation of the functionality of the trait analyzer 118 that analyzes the extracted data from documents obtained by the data collector 112 to derive behavior and personality traits of the person. The method starts at 602, where for each particular behavior or personality trait, the trait analyzer 118 identifies content attributes such as words or phrases in extracted data of a document obtained by the data collector 112. The trait analyzer 118 can identify content attributes in the extracted data that are found in a dictionary for the particular behavior or personality trait. For instance, the trait analyzer 118 can identify content attributes such as swear words for an agreeableness personality trait by looking up a dictionary for agreeableness personality traits. The trait analyzer 118 can identify derogatory or angry words for an anti-social personality trait by looking up a dictionary for anti-social personality traits. The trait analyzer 118 can identify words related to crime activities (e.g., "arrest", "indict", "bond", "convict", "misdemeanor", "petty theft", "homicide", "robber", "assault") for a behavior trait of involvement in crimes by looking up a dictionary for crime activities. The trait analyzer 118 can inspect context in the document, for example, to determine whether the person created a false or misleading online profile, provided false or misleading information to the service provider, is involved with drugs or alcohol, is involved with hate websites or organizations, is involved in sex work, perpetrated a crime, is involved in civil litigation, is a known fraudster or scammer, is involved in pornography, has authored online content with negative language, or has interests that indicate negative personality or behavior traits.

The trait analyzer 118 can identify content attributes in the extracted data in the document based on the identity score of the document. For instance, the trait analyzer 118 can identify content attributes in the entire extracted data of the document if the identity score is 1.0 (i.e., it is very certain that the document is directly related to or by the person). If the identity score is 0.5, the trait analyzer 118 can identify content attributes only in a portion (e.g., within a continuous block such as a paragraph) in the document that includes an identity attribute of the person. The trait analyzer 118 can also identify content attributes in the extracted data in the document based on the type of the document. For instance, if the document is a profile page or blog authored by the person, the trait analyzer 118 can identify content attributes in the entire extracted data of the document for personality traits such as anti-social tendencies, openness, extraversion, or narcissism.

The trait analyzer 118 then determines an initial score for the particular behavior or personality trait, based on weights associated with the identified content attributes (604). For instance, for the behavior trait of involvement in crimes, a higher score or weight (e.g., 1.0) is used if more serious words or phrases are identified (e.g., "homicide", "robbery"), while a lower score or weight (e.g., 0.4) if a less serious words or phrases are identified (e.g., "petty theft", "misdemeanor"). That is, a weight between a content attribute such as a word and a particular behavior or personality trait is determined based on the strength of the relationship between the content attribute and the particular behavior or personality trait. The weight can be determined based on rules or based on machine learning as described in this specification. The trait analyzer 118 can determine weights associated with words based on phrases or context including the words. For instance, for the behavior trait of involvement in sex work or pornography, a higher score or weight (e.g., 0.3) is used if a word "breast" is in the same sentence as another word referencing a female. A low score or weight (e.g., 0.0) is used if the word "breast" is in the phrase "breast cancer."

The trait analyzer 118 further weights the initial score based on the identity score of the document (606). For instance, the trait analyzer 118 can multiply the initial score by the identity score (which ranges between 0.0 and 1.0). That is, the more closely the document is related to the person, the heavier weights are given to the initial scores derived from the document.

Other weighting methods for the initial score are possible. For instance, the trait analyzer 118 can weight initial scores based on recency of the document (e.g., a more recent document is weighted higher than an older document).

In some implementations, the trait analyzer 118 can further weights the initial scores based on the original request requesting for determining trustworthiness of the person. For instance, a short-term lodging arrangement service provider or a financial service provider may want to know more about the person's past behavior of involvement in sex work or crimes. A ride-sharing lodging arrangement service may want to know more about the person's potential anti-social or neuroticism personality trait, or behavior trait of involvement in driving-under-influence (DUI) activities.

For a request from the short-term lodging arrangement service provider (or the financial service provider), the trait analyzer 118 can weight initial scores for behavior traits of involvement in sex work and crimes (as a perpetrator) more heavily than initial scores for other behavior and personality traits. For a request from the ride-sharing service provider, the trait analyzer 118 can weight initial scores for anti-social and neuroticism personality traits and behavior trait of involvement in DUI activities more heavily than initial scores for other behavior and personality traits. As another example, a recruiting service provider may want to determine whether the person has openness and extraversion personality traits that are desirable for a sales job opportunity. For a request from the recruiting service provider, the trait analyzer 118 can weight initial scores for openness and extraversion personality traits more heavily than initial scores for other behavior and personality traits.

If there are additional documents for the person as obtained by the data collector 112, the trait analyzer 118 repeats the steps of identifying content attributes, determining initial scores, and weighing initial scores by identity scores, as indicated by the loop-back arrow 610. In some implementations, the trait analyzer 118 performs the steps of identifying content attributes, determining initial scores, and weighing initial scores by identity scores only on documents associated with the particular behavior or personality trait. For instance, for the behavior trait of involvement of crimes, the trait analyzer 118 can perform these steps only on documents that are labeled as being related to crimes by the information extractor 114, as described earlier.

Otherwise, the trait analyzer 118 combines the initial scores to calculate a trait metric for the particular behavior or personality trait (612). The trait metric can be an average value of weighted initial scores of the particular behavior or personality trait, for example. Other methods for determining the trait metric based on the initial scores are possible.

The trait analyzer 118 then provides the behavior or personality trait metric to the holistic scoring 120 for obtaining a trustworthiness score of the person.

As described in reference to FIG. 2, in some implementations, after holistic scoring 120 processes the behavior or personality trait metric, a quality check step 222 can be performed before the trustworthiness score is determined. For example, an individual (or a software component of the server system 122) can examine content of the top weighted documents (e.g., five documents contributing most to the trustworthiness score, or a particular trait metric) for any erroneous data or erroneous identity information. A top weighted document with erroneous data or erroneous identity information can be discarded and the trustworthiness score can be determined with the remaining documents for the person, using the methods illustrated in FIGS. 2-6. In addition, the results of the quality check can be fed back as additional training data for the systems used by the identity extractor 116 and the trait analyzer 118, as indicated by the loopback arrows 251 and 252 in FIG. 2.

Figure 7:
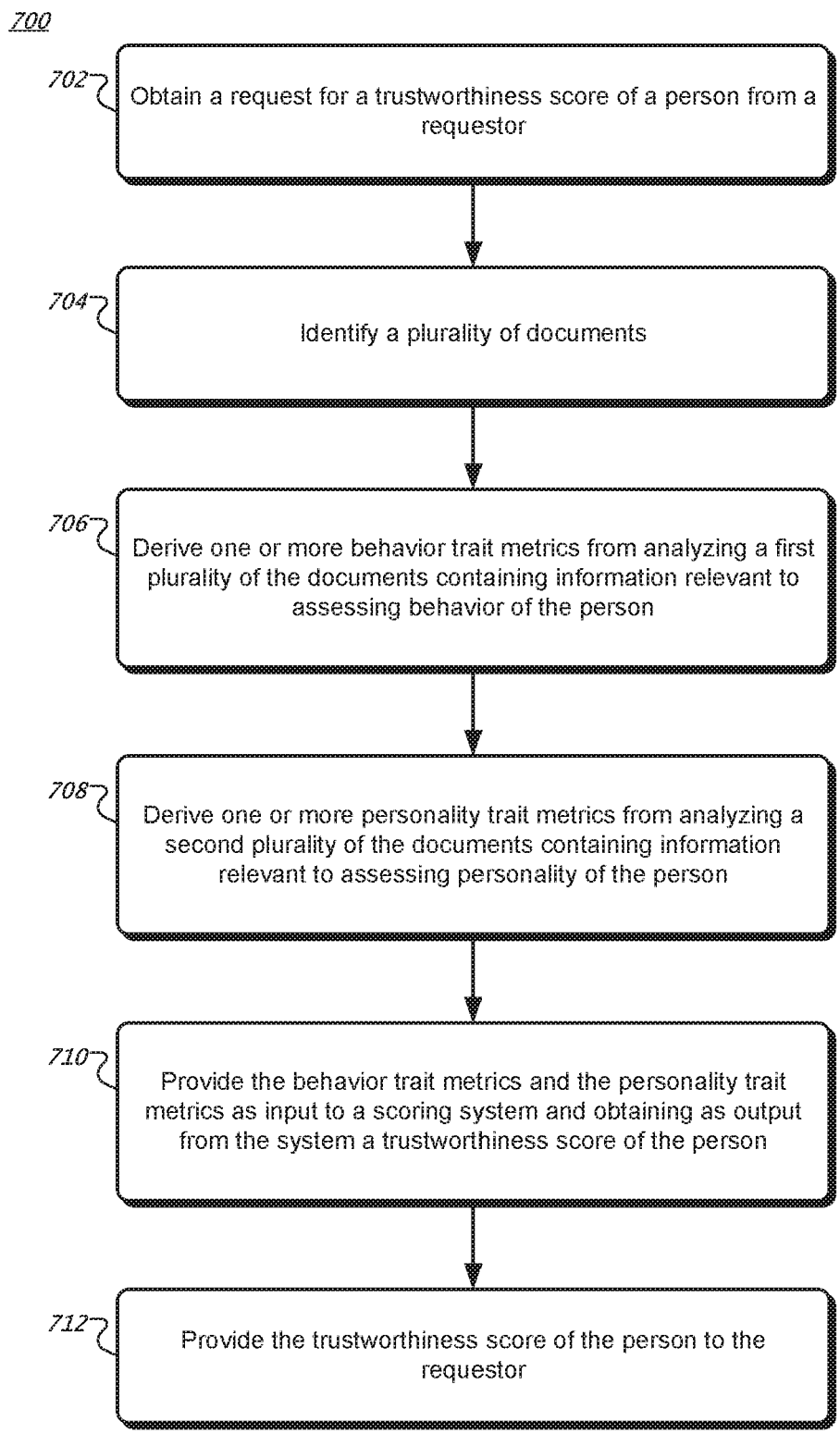
FIG. 7 is a flow chart of another example method for determining trustworthiness of a person.

FIG. 7 is a flow chart of another example method for determining trustworthiness of a person. The method can be implemented using software components executing on one or more data processing apparatus that are part of the data center 121 described earlier. The method begins by obtaining a request for a trustworthiness score of a person from a requestor (702). Based on the identification attributes of the person, the method identifies a plurality of documents that are related to the person (704). For instance, the data collector 112 or another software component of the server system 122 receives a request from a service provider for determining a trustworthiness score of a person. The data collector 112 identifies and obtains documents that are related to the person.

The method derives one or more behavior trait metrics from analyzing a first plurality of the documents containing information relevant to assessing behavior of the person (706). The method derives one or more personality trait metrics from analyzing a second plurality of the documents containing information relevant to assessing a personality of the person (708). For instance, the information extractor 114 extracts from the documents obtained by the data collector 112 data relevant to assessing particular behavior or personality traits of the person. The particular behavior or personality traits predict the likelihood of the person being a positive actor in an online or offline person-to-person interaction. The identification matcher 116 calculates respective identity scores for the documents obtained by the data collector 112. The trait analyzers 118 calculates respective trait metrics for the particular behavior or personality traits based on dictionary look-up of content attributes identified in the documents, and based on weights associated with the identified content attributes and the identity scores.

The method provides the behavior trait metrics and the personality trait metrics as input to a scoring system and obtaining as output from the system a trustworthiness score of the person, wherein the scoring system is rule based or a machine learning system (710). The method provides the trustworthiness score of the person to the requestor (712). For instance, the holistic scoring 120 inputs the trait metrics calculated by the trait analyzers 118 to a machine learning system, and obtains the output from the machine learning system as a trustworthiness score for the person. The holistic scoring 120 then provides the trustworthiness score to the service provider (the requestor).

Figure 8:
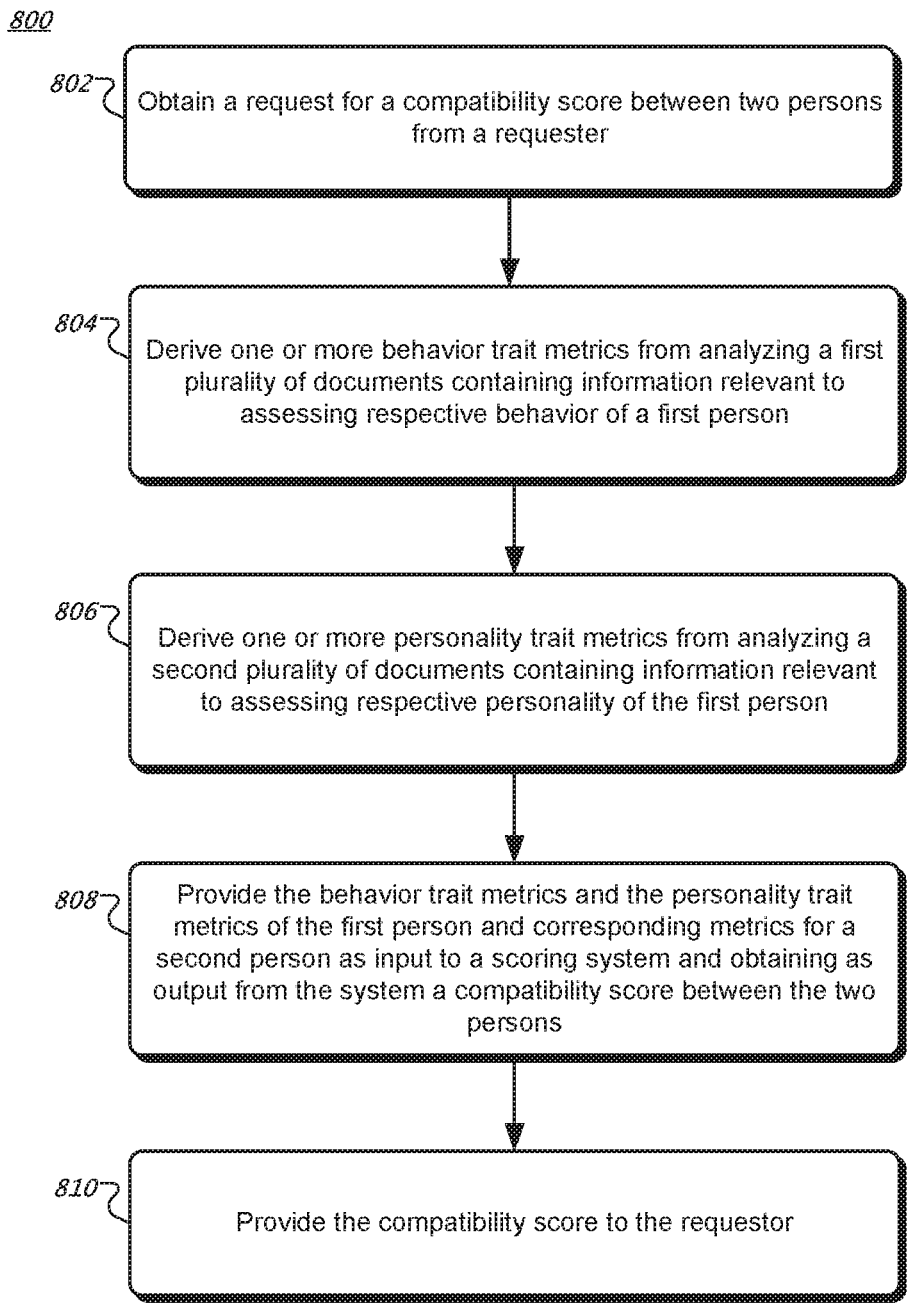
FIG. 8 is a flow chart of another example method for determining compatibility of a person.

FIG. 8 is a flow chart of another example method for determining compatibility of a person. The method can be implemented using software components executing on one or more data processing apparatus that are part of the data center 121 described earlier. The method begins by obtaining a request for a compatibility score between two persons from a requestor (802). The method derives one or more behavior trait metrics from analyzing a first plurality of documents containing information relevant to assessing respective behavior of a first person (804). The method derives one or more personality trait metrics from analyzing a second plurality of documents containing information relevant to assessing respective personality of the first person (806). The method provides the behavior trait metrics and the personality trait metrics of the first person and corresponding metrics for a second person as input to a scoring system and obtaining as output from the system a compatibility score between the two persons (808). The method provides the compatibility score to the requestor (810).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   analyzing, using one or more computer processors, each of a plurality of documents related to a person to identify content attributes that occur in a dictionary for behavior or personality traits;
   calculating, using the one or more computer processors, an initial score for each behavior and personality trait related to the identified content attributes;
   calculating, using the one or more computer processors, trait metrics for each behavior or personality trait by combining initial scores for each behavior or personality trait;
   providing, using the one or more computer processors, the trait metrics as input to a rule based scoring and machine learning system;
   obtaining, from the rule based scoring and machine learning system, a trustworthiness score of the person output from the rule based scoring and machine learning system;
   receiving an indication that a second person trusts the person;
   creating a relationship between the second person and the person; and
   adjusting the trustworthiness score of the person based on, at least, a trustworthiness score of the second person.

2. The method of claim 1, wherein calculating an initial score for each behavior and personality trait related to the identified content attributes is based on weights associated with the identified content attributes.

3. The method of claim 1, wherein analyzing each of the plurality of documents to identify content attributes comprises identifying one or more portions of each document that contain text authored by the person or that provide information about the person.

4. The method of claim 1, further comprising:
   determining that the trustworthiness score is not accurate; and
   retraining the rule based scoring and machine learning system to correct for the inaccuracy using the trait metrics.

5. The method of claim 2, wherein a behavior or personality trait includes at least one of a group comprising: badness, anti-social tendencies, goodness, conscientiousness, openness, extraversion, agreeableness, neuroticism, narcissism, Machiavellianism, and psychopathy.

6. The method of claim 1, wherein a behavior or personality trait includes at least one of a group comprising: creating a false or misleading online profile or providing false or misleading information to a service provider, involvement with drugs or alcohol, involvement with hate websites or organizations, involvement in sex work, involvement in a crime, involvement in civil litigation, being a known fraudster or scammer, involvement in pornography, and authoring online content with negative language.

7. The method of claim 1, wherein calculating an initial score for each behavior and personality trait related to the identified attributes is based on an identity score for each of the plurality of documents.

8. The method of claim 7, wherein the identity score for each of the plurality of documents is calculated by:
   identifying identity information within each document of the plurality of documents;
   determining the uniqueness of the identify information identified within each document of the plurality of documents; and
   calculating the identity score for each of the plurality of documents based on matching one or more identification attributes of the person to the identity information in each document of the plurality of documents and the uniqueness of the identity information.

9. The method of claim 8, further comprising:
   determining that at least one document comprises new identity information;
   determining whether the identity score for the at least one document exceeds a predetermined threshold; and
   based on determining that the identity score for the at least one document exceeds a predetermined threshold, adding the new identity information to the identification attributes of the person.

10. The method of claim 9, further comprising the steps of:

determining whether user input identification attributes are authentic by determining if the identity information of the person contained in one or more documents of the plurality of documents is consistent with the user input identification attributes; and calculating the trait metrics based on determining that the user input identification attributes are authentic.

11. A computing system comprising:

a memory that stores instructions; and one or more processors configured by the instructions to perform operations comprising:

analyzing each of a plurality of documents related to a person to identify content attributes that occur in a dictionary for behavior or personality traits;

calculating an initial score for each behavior and personality trait related to the identified content attributes;

calculating trait metrics for each behavior or personality trait by combining initial scores for each behavior or personality trait;

providing the trait metrics as input to a rule based scoring and machine learning system;

obtaining, from the rule based scoring and machine learning system, a trustworthiness score of the person output from the rule based scoring and machine learning system;

receiving an indication that a second person trusts the person;

creating a relationship between the second person and the person; and adjusting the trustworthiness score of the person based on, at least, a trustworthiness score of the second person.

12. The computing system of claim 11, wherein calculating an initial score for each behavior and personality trait related to the identified content attributes is based on weights associated with the identified content attributes.

13. The computing system of claim 11, wherein analyzing each of the plurality of documents to identify content attributes comprises identifying one or more portions of each document that contain text authored by the person or that provide information about the person.

14. The computing system of claim 11, further comprising:

determining that the trustworthiness score is not accurate; and retraining the rule based scoring and machine learning system to correct for the inaccuracy using the trait metrics.

15. The computing system of claim 12, wherein a behavior or personality trait includes at least one of a group comprising: badness, anti-social tendencies, goodness, conscientiousness, openness, extraversion, agreeableness, neuroticism, narcissism, Machiavellianism, and psychopathy.

16. The computing system of claim 11, wherein a behavior or personality trait includes at least one of a group comprising: creating a false or misleading online profile or providing false or misleading information to a service provider, involvement with drugs or alcohol, involvement with hate websites or organizations, involvement in sex work, involvement in a crime, involvement in civil litigation, being a known fraudster or scammer, involvement in pornography, and authoring online content with negative language.

17. The computing system of claim 11, wherein calculating an initial score for each behavior and personality trait related to the identified attributes is based on an identity score for each of the plurality of documents.

18. The computing system of claim 17, wherein the identity score for each of the plurality of documents is calculated by:

identifying identity information within each document of the plurality of documents;

determining the uniqueness of the identify information identified within each document of the plurality of documents; and calculating the identity score for each of the plurality of documents based on matching one or more identification attributes of the person to the identity information in each document of the plurality of documents and the uniqueness of the identity information.

19. The computing system of claim 18, further comprising:

determining that at least one document comprises new identity information;

determining whether the identity score for the at least one document exceeds a predetermined threshold; and based on determining that the identity score for the at least one document exceeds a predetermined threshold, adding the new identity information to the identification attributes of the person.

20. A non-transitory computer-readable medium comprising instruction stored thereon that are executable by at least one processor to cause a computing device to perform operations comprising:

analyzing each of a plurality of documents related to a person to identify content attributes that occur in a dictionary for behavior or personality traits;

calculating an initial score for each behavior and personality trait related to the identified content attributes;

calculating trait metrics for each behavior or personality trait by combining initial scores for each behavior or personality trait;

providing the trait metrics as input to a rule based scoring and machine learning system;

obtaining, from the rule based scoring and machine learning system, a trustworthiness score of the person output from the rule based scoring and machine learning system;

receiving an indication that a second person trusts the person;

creating a relationship between the second person and the person; and adjusting the trustworthiness score of the person based on, at least, a trustworthiness score of the second person.

* * * * *